US009712744B2

(12) United States Patent
Ghosh et al.

(10) Patent No.: US 9,712,744 B2
(45) Date of Patent: Jul. 18, 2017

(54) IMAGE QUALITY COMPENSATION SYSTEM AND METHOD (71) Applicant: Intel Corporation, Santa Clara, CA (US)

(72) Inventors: Rahuldeva Ghosh, Portland, OR (US); Ranjit S. Narjala, Portland, OR (US); Sanjay Bakshi, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/779,879

(22) PCT Filed: Dec. 19, 2014

(86) PCT No.: PCT/US2014/071527
§ 371 (c)(1),
(2) Date: Sep. 24, 2015

(87) PCT Pub. No.: WO2016/076897
PCT Pub. Date: May 19, 2016

(65) Prior Publication Data
US 2016/0330370 A1 Nov. 10, 2016

Related U.S. Application Data (60) Provisional application No. 62/079,003, filed on Nov. 13, 2014.

(51) Int. Cl.
*H04N 5/235* (2006.01)
*H04N 5/232* (2006.01)
(Continued)

(52) U.S. Cl.
CPC ..... *H04N 5/23222* (2013.01); *G06K 9/00281* (2013.01); *G06K 9/036* (2013.01);
(Continued)

(58) Field of Classification Search
CPC ........................ H04N 5/23219; H04N 5/235
(Continued)

(56) References Cited

U.S. PATENT DOCUMENTS

| 6,906,745 | B1 * | 6/2005 | Fossum | ................ | H04N 5/2352 |
|---|---|---|---|---|---|
| | | | | | 348/229.1 |
| 9,179,062 | B1 * | 11/2015 | Rivard | ................. | H04N 5/2256 |

(Continued)

FOREIGN PATENT DOCUMENTS

| EP | 2061233 A1 | 5/2009 |
|---|---|---|
| JP | 2007094787 A | 4/2007 |
| JP | 2011061809 A | 3/2011 |

OTHER PUBLICATIONS

"International Application Serial No. PCT/US2014/071527, International Search Report mailed Jul. 30, 2015", 3 pgs.

(Continued)

*Primary Examiner* — Anthony J Daniels
(74) *Attorney, Agent, or Firm* — Schwegman Lundberg & Woessner, P.A.

(57) ABSTRACT

A user authentication system and method. The user authentication system includes a camera and a processor connected to the camera. The processor receives images from the camera, searches for a user feature in the images, determines if the images require correction, adjusts camera controls in a pre-defined order to provide desired corrections, applies the desired corrections to subsequent images and authenticates the user based on the user feature in the corrected images.

24 Claims, 8 Drawing Sheets

(51) Int. Cl.
*G06K 9/03* (2006.01)
*G06K 9/20* (2006.01)
*G06K 9/46* (2006.01)
*G06T 5/00* (2006.01)
*G06T 7/00* (2017.01)
*G06K 9/00* (2006.01)

(52) U.S. Cl.
CPC ......... *G06K 9/2027* (2013.01); *G06K 9/4642* (2013.01); *G06T 5/00* (2013.01); *G06T 7/0002* (2013.01); *G06K 9/00221* (2013.01); *G06K 9/00912* (2013.01); *G06T 2207/20172* (2013.01); *G06T 2207/30168* (2013.01)

(58) Field of Classification Search
USPC ........................... 348/221.1, 229.1, 254, 255
See application file for complete search history.

(56) References Cited

U.S. PATENT DOCUMENTS

| | | | | |
|---|---|---|---|---|
| 2001/0013903 A1* | 8/2001 | Suzuki | ................ | H04N 5/2353 348/362 |
| 2003/0098914 A1* | 5/2003 | Easwar | .................... | G03B 3/00 348/229.1 |
| 2005/0275737 A1* | 12/2005 | Cheng | ................... | H04N 5/2351 348/333.02 |
| 2008/0062278 A1 | 3/2008 | Khan et al. | | |
| 2008/0219516 A1* | 9/2008 | Suzuki | ............... | G06K 9/00228 382/118 |
| 2010/0014775 A1 | 1/2010 | Ikeda | | |
| 2011/0115971 A1* | 5/2011 | Furuya | ..................... | G03B 7/08 348/371 |
| 2012/0044380 A1* | 2/2012 | Imai | ....................... | H04N 9/735 348/223.1 |
| 2013/0265451 A1* | 10/2013 | Son | .................... | H04N 5/23222 348/207.1 |
| 2015/0015735 A1* | 1/2015 | Rav-Acha | .......... | H04N 5/23219 348/222.1 |

OTHER PUBLICATIONS

"International Application Serial No. PCT/US2014/071527, Written Opinion mailed Jul. 30, 2015", 9 pgs.

* cited by examiner

IMAGE QUALITY COMPENSATION SYSTEM AND METHOD

PRIORITY APPLICATION

This application is a U.S. National Stage Application under 35 U.S.C. 371 from International Application Number PCT/US2014/071527, filed Dec. 19, 2014, which claims the benefit of priority to U.S. Provisional Application Ser. No. 62/079,003, filed Nov. 13, 2014, all of which are incorporated herein by reference in their entirety.

BACKGROUND

Facial recognition in PCs, tablets and phones is very dependent on image quality produced by integrated user-facing cameras, which in turn are very dependent on ambient lighting conditions. These cameras are primarily calibrated to tune their settings for best photographic quality as opposed to focusing on the user's face. As a result in sub-optimal lighting conditions, e.g. dark room, direct sunlight, bright background (e.g., open window), the user's face is too dark, too bright or silhouetted. This severely hampers face detection and recognition, thus making facial recognition an unreliable experience across typical usage environments.

Current facial recognition solutions suffer from degraded performance and, in some cases, fail to even detect the user's face in adverse lighting conditions, such as when the illumination is less than 30 lux (dark areas), greater than 10,000 lux (direct sunlight) or obscured by a bright background (e.g., when the foreground illumination is less than 100 lux and the background is greater than 1000 lux). Webcams perform unevenly across platforms and OEMs and are not calibrated to highlight the face over the background in adverse lighting conditions, leading to the failure of face recognition.

A common technique used to compensate for low light is to convert the laptop/tablet screen to an all-white image, thus using the screen's brightness to illuminate the subject (e.g. Sensible Vision's FaceBright). However, tablet/notebook screen brightness is frequently auto-tuned by ambient light sensors to a low setting in low lighting conditions, resulting in the white screen not being very bright and hence hampering the efficacy of this method. Distance of face from the computer screen is another factor contributing to this method's questionable reliability. Also this method does not address the problems inherent from direct sunlight and from bright backgrounds.

BRIEF DESCRIPTION OF THE DRAWINGS

Embodiments are illustrated by way of example, and not by way of limitation, in the figures of the accompanying drawings in which like reference numerals refer to similar elements.

DESCRIPTION OF THE EMBODIMENTS

As noted above, facial recognition in PCs, tablets and phones is very dependent on image quality produced by integrated user-facing cameras, which in turn are very dependent on ambient lighting conditions. These cameras are primarily calibrated to tune their settings for best photographic quality as opposed to focusing on the user's face. As a result, in sub-optimal lighting conditions, the image captured is less than optimal. This severely hampers face detection and recognition, thus making facial recognition an unreliable experience across typical usage environments.

Figure 1A:
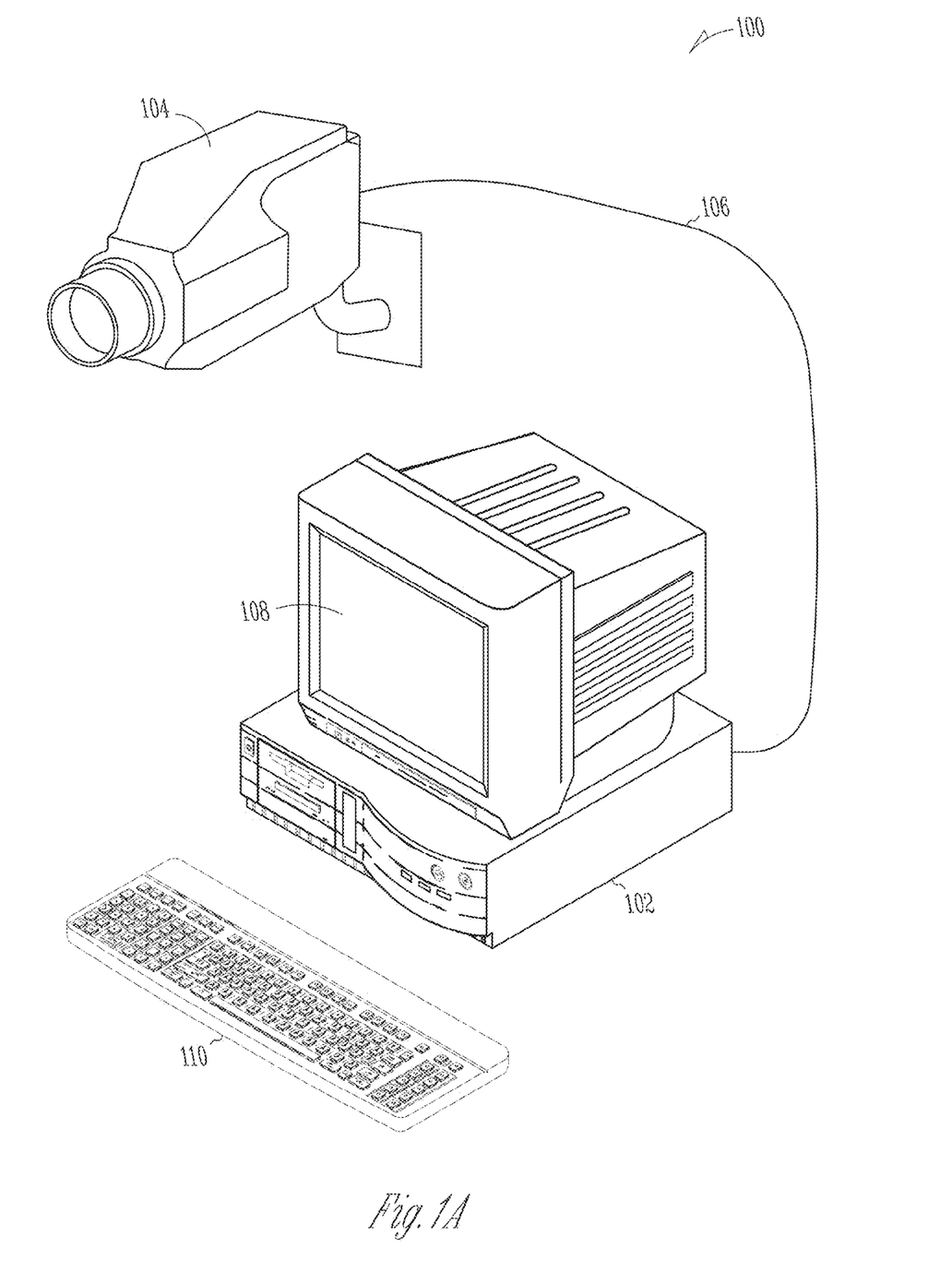
FIGS. 1A and 1B illustrate feature-based authentication systems.

FIG. 1A illustrates a feature-based authentication system 100. System 100 of FIG. 1A includes a computing system 102 connected to one or more cameras 104 via a connector 106. In some embodiments, computer system 102 includes a display 108, a processor and memory used to store data and programs. In some embodiments, an input device 110 (such as, for example, a keyboard or a mouse) is connected to computing system 102 as well. In some embodiments, connector 106 is a Universal Serial Bus (USB) cable, while in other embodiments connector 106 is a network such as Ethernet.

In one embodiment, system 100 aims to resolve the reliability problem noted above by overriding the firmware of camera 104 and employing a system to externally adjust camera settings such as exposure, gamma correction and gain to compensate for ambient lighting conditions. In one such embodiment, the goal is to homogenize facial recognition efficacy and reliability across all lighting conditions and cameras.

In one embodiment, system 100 resolves the issue of sub-optimal lighting conditions by tuning camera image capture settings to highlight the face across all lighting conditions, including the use cases cited above, thus enabling optimal face detection and recognition no matter where the user is, the system they are using or the type of camera 104 in their system 100.

In one example embodiment, a sub-optimal lighting image compensation system operating in either camera 104 or computer system 102 overrides default camera firmware behavior using video control and camera control interfaces, namely exposure, gamma correction and gain control to adjust image quality for optimal face detection. In one such embodiment, the system runs in a feedback loop running face detection and checking image quality in real time using Intel Integrated Performance Primitives (IPP) image processing libraries. The Intel Integrated Performance Primitives (IPP) image processing libraries are libraries of highly optimized building blocks for media and data applications. In one embodiment, camera adjustments are made based on image quality feedback received after each image processing iteration, specifically targeting enhancing face visibility over general photographic quality. The result is an image with enhanced sharpness and signal-to-noise ratio (SNR) that aids edge detection and feature extraction tailored to enable face detection in virtually any lighting condition.

Figure 1B:
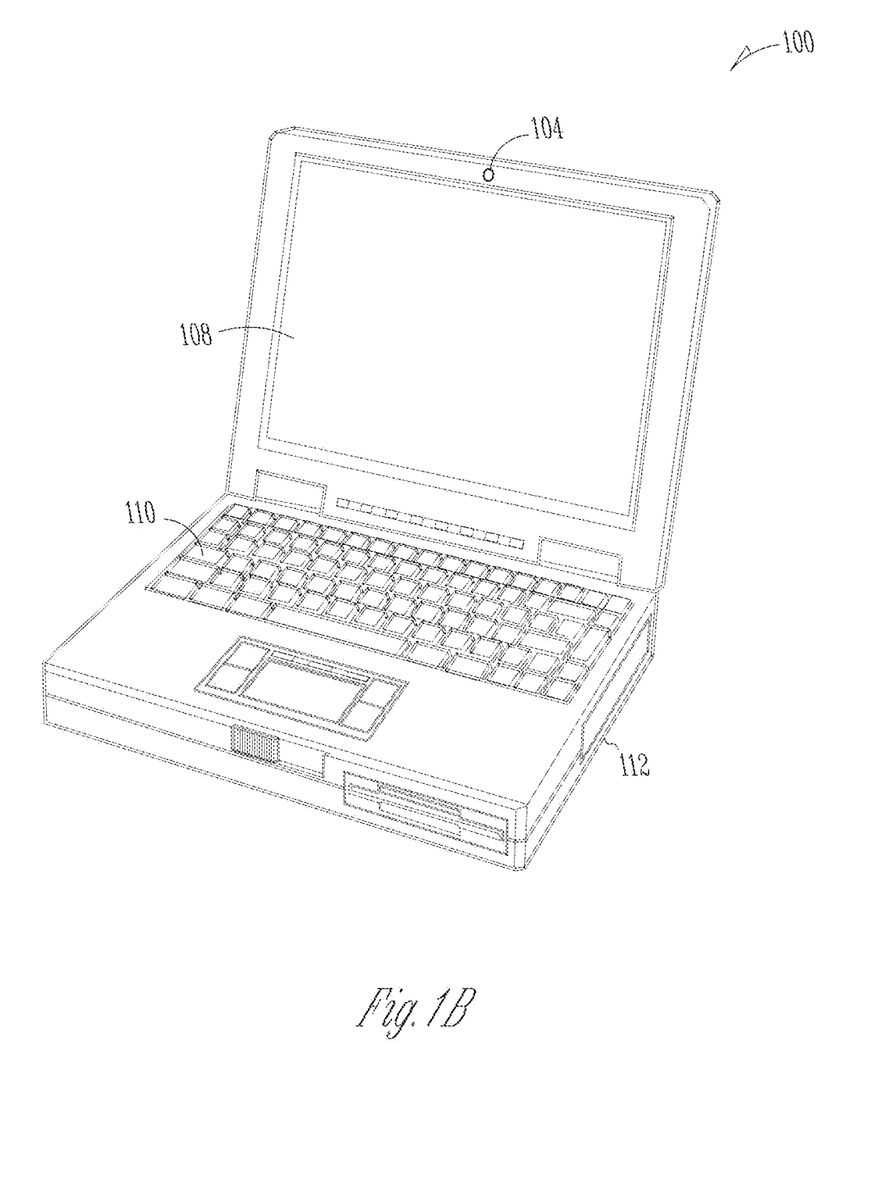

Authentication system 100 can be implemented in any camera enabled compute system, including desktops, laptops, tablets and phones. One example embodiment of a laptop-based authentication system 100 is shown in FIG. 1B. System 100 of FIG. 1B includes a laptop system 112 with one or more internal cameras 104. In some embodiments, laptop system 112 includes a display 108, a processor and memory used to store data and programs. In some embodiments, an input device 110 (such as, for example, a keyboard or a mouse) is connected to laptop system 112 as well.

As noted above in the discussion of FIG. 1A, system 100 of FIG. 1B, in one embodiment, aims to resolve the reliability problem noted above by overriding the firmware of integrated camera 104 and employing a system to externally adjust camera settings such as exposure, gamma correction and gain to compensate for ambient lighting conditions. In one such embodiment, the goal is to homogenize facial recognition efficacy and reliability across all lighting conditions and cameras. In some such embodiments, laptop system 112 executes program code in a feedback loop running face detection and checking image quality in real time using Intel Integrated Performance Primitives (IPP) image processing libraries.

Figure 2A:
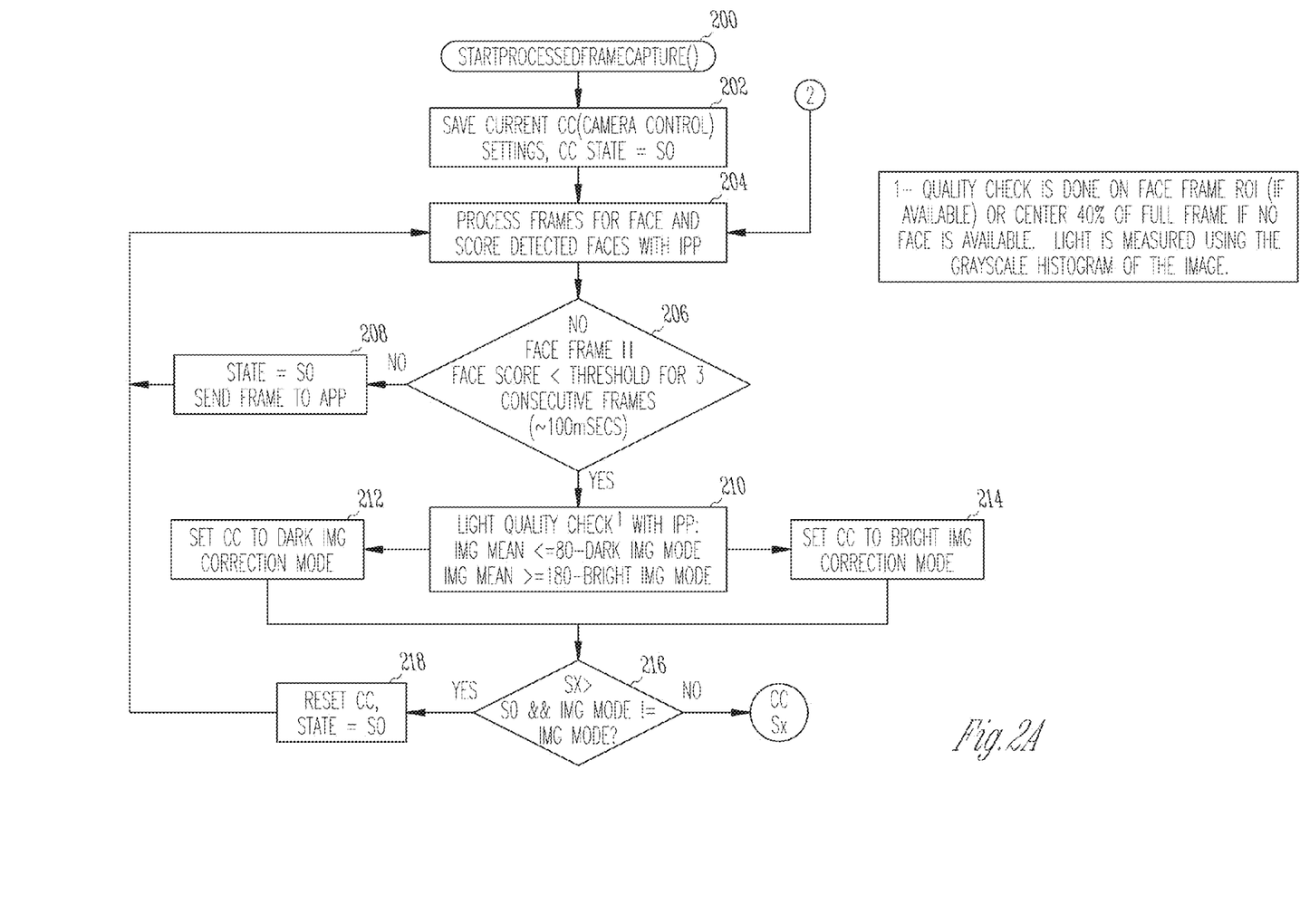
FIGS. 2A and 2B illustrate a method for correcting an image to be used in the authentication system of FIG. 1.
Figure 2B:
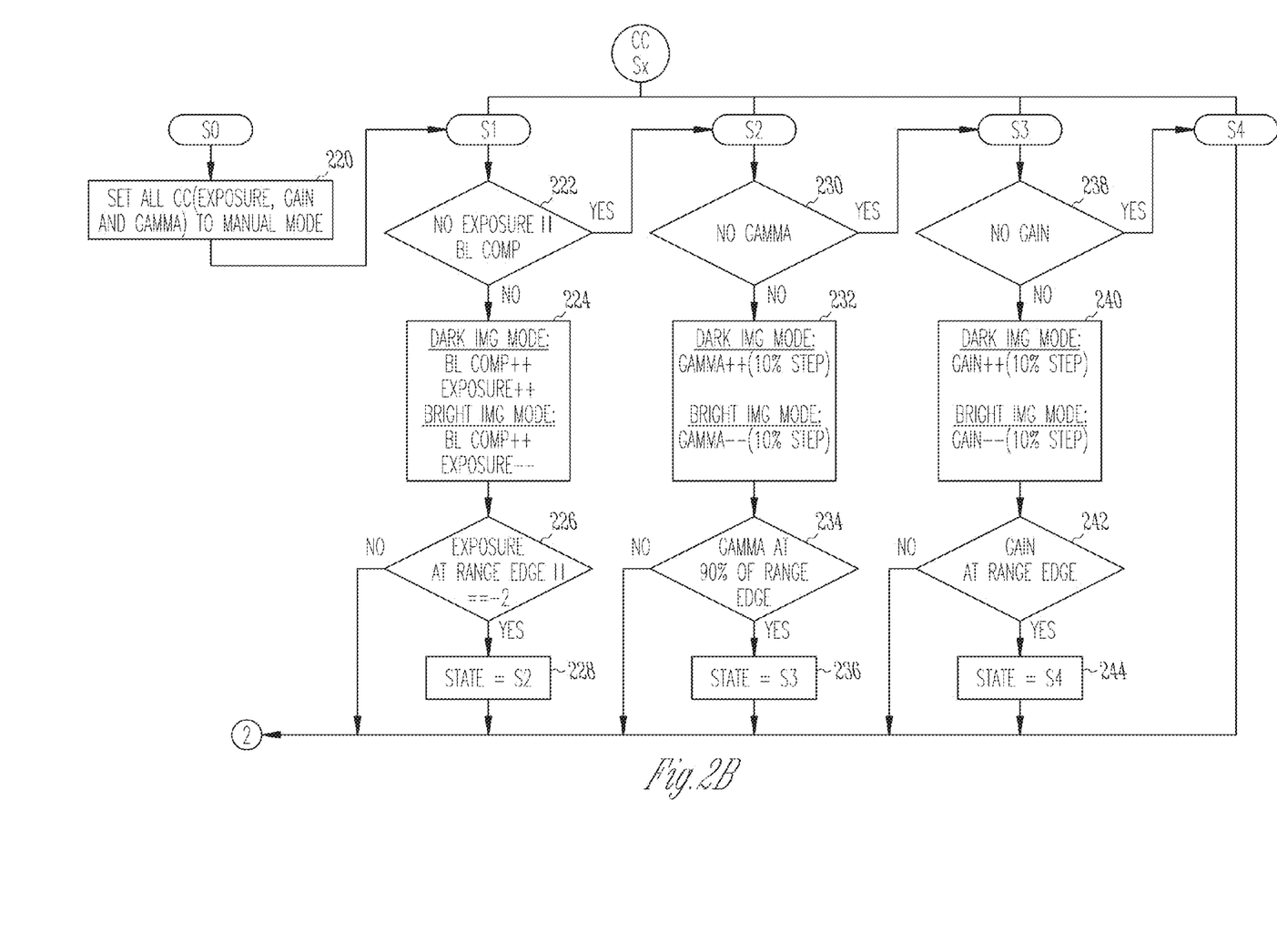

A method of adjusting camera 104 to provide an optimized image for facial recognition is shown in FIGS. 2A and 2B. At 200, a new frame is captured by camera 104. At 202, the current camera control settings for camera 104 are saved to memory (as camera state S0). At 204, the captured frame is processed to detect a face. In the following, a face image will be used to demonstrate the method shown in FIGS. 2A and 2B. Other user features, such as feet, hands, or the shape of the user's eyes, could be used as well.

In one embodiment, a score is calculated at 204 that is a measure of the quality of the face image. In one such embodiment face image quality is a function of analysis of facial landmarks in the image. In one embodiment, face detection and quality scoring is performed with IPP primitives.

At 206, if no face has been detected in the frame or the face score is less than a threshold value for the last three consecutive frames, control moves to 210. Otherwise, control moves to 208, the frame is sent to the facial recognition application and the state of the camera controls is set to its state S0.

At 210, an image quality check is conducted on the frame. In one embodiment, the reason that the method reached 210 is because the image is either too bright or too dark to obtain a good image of the face. In such an embodiment, the image quality check at 210 determines if the image is too dark (due to, for example, low light) or too bright (due to, for example, bright sunlight). If too dark, control moves to 212 and the camera controls are set to a dark image correction mode. If too bright, control moves to 214 and the camera controls are set to a bright image correction mode (for instance, to reduce exposure). Control then moves to 216.

In some embodiments, the image quality check is done on either the face image, or on the center 40% of the full frame if no face is available. In one such embodiment, light is measured using a gray scale histogram of the portion of the image being reviewed.

At 216 a check is made to determine if system 100 is still correcting the image for the image correction mode (dark or bright image correction) that was first determined at 210. As noted above, the quality of the image is checked at 210 to determine if we need to improve a dark (low light) image or a bright (overexposed) image. If the image correction mode has changed from the previous image correction mode (for example, a bright light was turned on in the dimly lit room, or a bright light was turned off in what became a dimly lit room), then the previous corrections are no longer viable. In the embodiment shown in FIG. 2A, control then moves to 218 and camera controls settings for camera 104 are restored to state S0.

In some embodiments, at 218, camera control settings for camera 104 transition gradually back to state S0 over a predefined number of frames.

If, at 216, it is determined that system 100 is still correcting the image for the image correction mode (dark or bright image correction) that was first determined at 210, further image correction is needed. Control moves to Sx, where x is the current state of the camera controls and, in the embodiment shown in FIGS. 2A and 2B, is an integer between 1 and 4.

If x=0, control moves to S0, and all camera controls are set to manual mode at 220. In the embodiment shown in FIG. 2B, this includes exposure, gain and gamma. Control them moves to S1.

At S1, control moves to 222 and a check is made to see if there is either exposure correction or backlight compensation in camera 104. If not, control moves to S2 with the current state of camera controls set to S2.

If, however, either exposure correction or backlight compensation exists in camera 104, control moves to 224 and, if in dark image mode of this embodiment, backlight compensation is increased and exposure is increased. If, at 224, the image mode is bright image mode, backlight compensation is increased and exposure is reduced.

Control then moves to 226, where a check is made to see if exposure correction and/or backlight compensation is at its limits. If not, control moves to 204 with the current state of camera controls set to S1 and the current camera controls are applied to the next image received from camera 104.

If, however, exposure correction and/or backlight compensation is at its limits, camera control state is set to S2 at 228 before control moves to 204.

At S2, control moves to 230 and a check is made to see if there is gamma correction in camera 104. If not, control moves to S3 with the current state of camera controls set to S3.

If, however, the check at 230 determines that there is gamma correction in camera 104, control moves to 232. At 232, if the image mode is in dark image correction mode, gamma correction is increased. In one embodiment, the correction is a 10% step. At 232, if the image mode is in bright image correction mode, gamma correction is decreased. In one embodiment, the decrease is a 10% step. Control then moves to 234, where a check is made to see if gamma correction is nearing its limits If not, control moves to 204 with the current state of camera controls set to S2. The current camera controls are then applied to the next image received from camera 104.

If, however, gamma correction is nearing its limits at 234, camera control state is set to S3 at 236 before control moves to 204.

At S3, control moves to 238 and a check is made to see if gain correction is available in camera 104. If not, control moves to S4 with the current state of camera controls set to S4. The current S4 camera controls are then applied to the next image received from camera 104.

If, however, the check at 238 determines that there is gain correction in camera 104, control moves to 240. At 240, if the image mode is in dark image correction mode, gain correction is increased. In one embodiment, the correction is a 10% step. At 240, if the image mode is in bright image correction mode, gain correction is decreased. In one embodiment, the decrease is a 10% step. Control then moves to 242, where a check is made to see if gain correction is nearing its limits. If not, control moves to 204 with the current state of camera controls set to S3. The current camera controls are then applied to the next image received from camera 104.

If, however, gain correction is nearing its limits at 242, camera control state is set to S4 at 244 before control moves to 204.

In some embodiments, a determination is made at 216 whether the image requires additional correction, whether the image was overcorrected or whether a new frame illustrates that lighting conditions have changed since the last iteration. In some such embodiments, if system 100 overshoots on its correction, system 100 reduces the correction by half the amount system 100 uses to increase correction.

The solution described above works on PCs, tablets and phones as it is independent of screen lighting and robust against motion (i.e., the user walking with system in hand) The use of Intel Integrated Performance Primitives libraries helps system 100 perform image compensation in real-time (that is, at frame capture rate) thus ensuring adequate performance across a variety of platforms.

Our approach differs from existing consumer-based facial resolution applications primarily by targeting image quality compensation to enhance computer vision-based face detection (i.e., photographic quality is sacrificed to produce an image that may look noisy and color-challenged to the human eye but is optimal for machine learning algorithms to detect a face and extract features). In one embodiment, system 100 overrides the camera's normal exposure, gamma and gain settings to arrive at the best face image possible (for facial recognition) given the existing lighting conditions.

Other camera controls may be available as well, such as brightness, contrast, white balance, sharpness, saturation and focus.

Examples of application of the above methods are provided in FIGS. 3B-5B. In the pictures shown in FIGS. 3A-5A, the image is one that was captured by a camera 104 and which failed face detection. The corresponding images in FIGS. 3B-5B, show the compensated image with successful face detection. In the example embodiments shown in FIGS. 3B-5B, the green brackets indicate that a face of sufficient quality for facial recognition was found. Subsequent tests confirmed that the compensated images were successfully matched for the user, resulting in authentication of the user to the device.

Figure 3A:
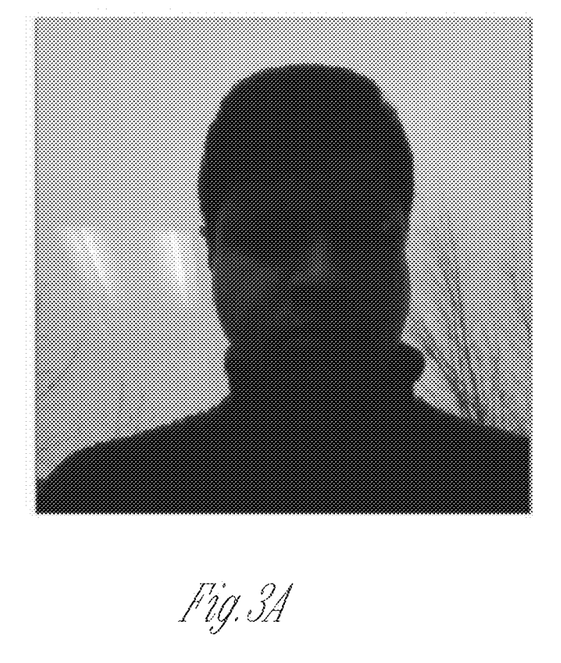
FIG. 3A shows a face image taken against a bright background.
Figure 3B:
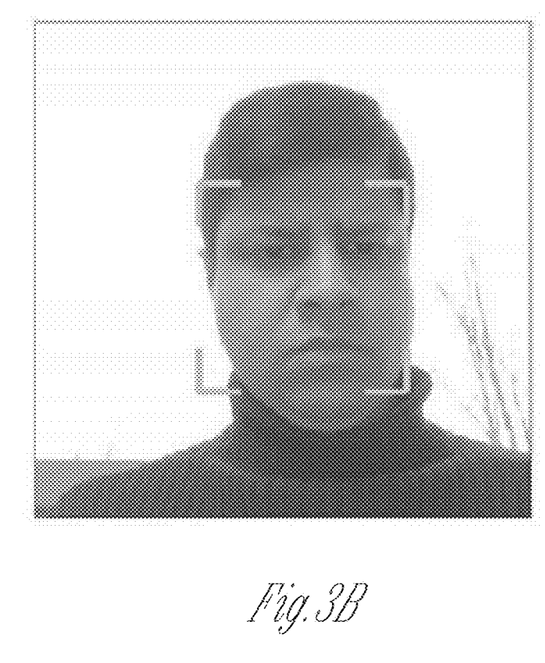
FIG. 3B illustrates correction of the image shown in FIG. 3A.

In the example shown in FIG. 3A, the image is one taken with a bright background. In the example the picture was taken with a window behind the subject. The subject's face is underexposed. Application of the methods above made the face more recognizable and susceptible for facial recognition programs, as can be seen in the image of FIG. 3B. In some embodiments, if system 100 identifies what appears to be a face, it allows subsequent frames to be overexposed as necessary to reveal facial features required for authentication.

Figure 4A:
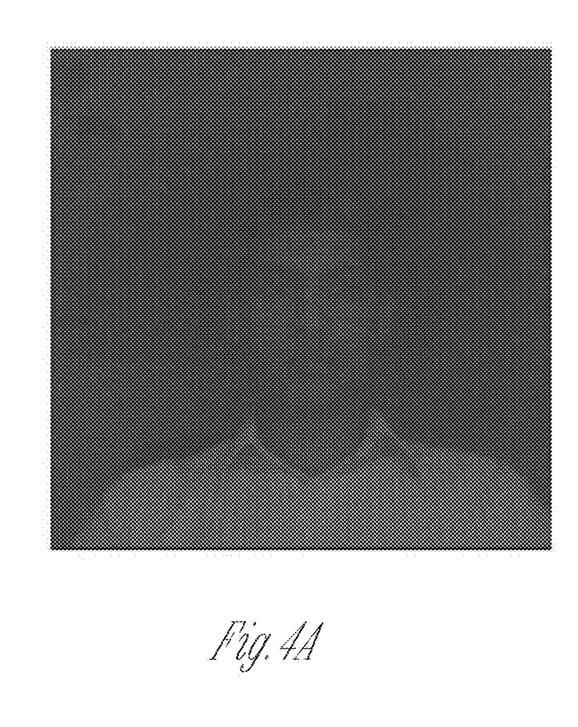
FIG. 4A shows a face image taken in low light conditions.
Figure 4B:
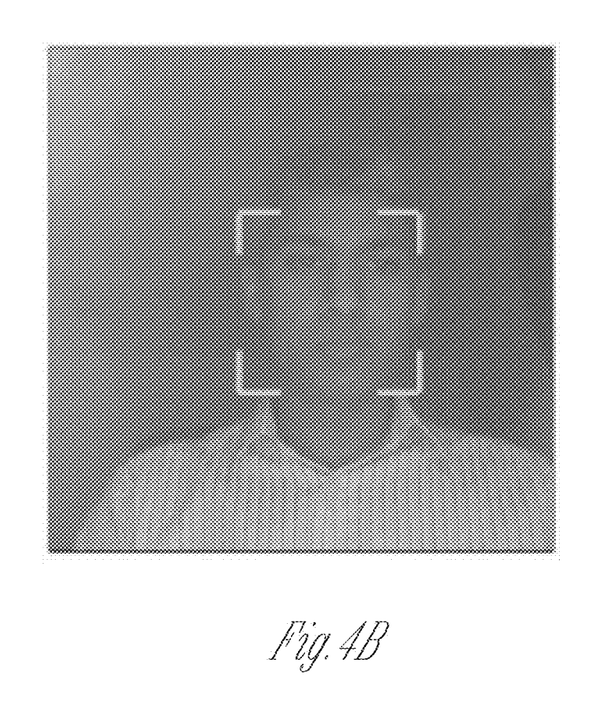
FIG. 4B illustrates correction of the image shown in FIG. 4A.

In the example shown in FIG. 4A, the picture was taken in low light conditions. Application of the methods discussed above, highlight the subject's face to the detriment of any background fidelity as can be seen in FIG. 4B.

Figure 5A:
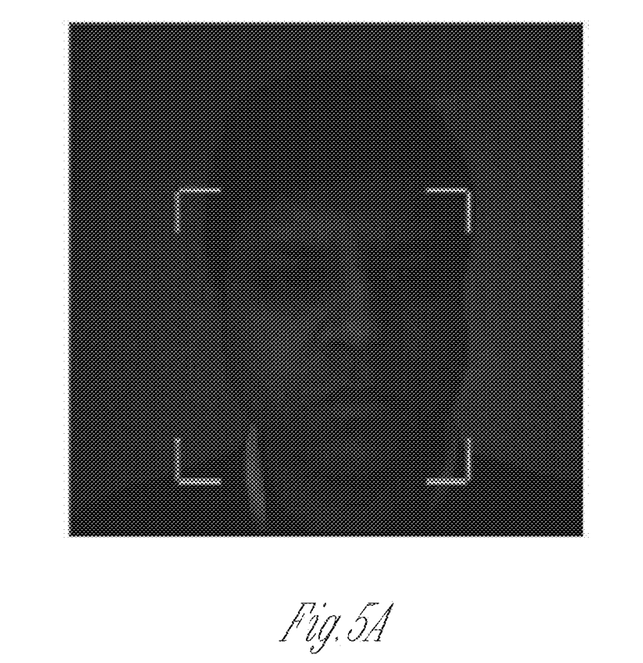
FIG. 5A shows a face image taken in very low light conditions.

Finally, in the example shown in FIG. 5A, the picture was taken in a very low light environment. In one example embodiment, in a dark room, camera 104 adjusts camera settings in different ways to attempt to find edges that represent the outline of a face. In a very dark room, in some embodiments, camera 104 adjusts exposure to be very high, resulting in a noisy image as can be seen in FIG. 5B.

In one such embodiment, if no face is detected, system 100 assumes a face will be found in the center of the image. In such embodiments, the center of the image is the region of interest (ROI). In some such embodiments, the ROI is the center 40% of the full frame; system 100 measures image intensity across the ROI and raises gamma, exposure and gain as necessary to enhance facial features for authentication.

Figure 5B:
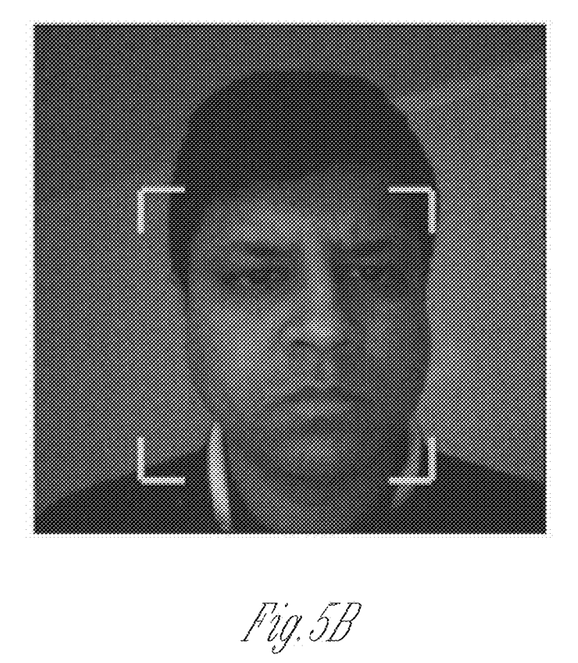
FIG. 5B illustrates correction of the image shown in FIG. 5A.

As can be seen in FIG. 5B, the corrections above were able to capture facial characteristics at the price of including some artifacts in the corrected picture. As noted above, the methods described above target enhancing face visibility over general photographic quality. The result is an image with enhanced sharpness and signal-to-noise ratio (SNR) that aids edge detection and feature extraction tailored to enable face detection in virtually any lighting condition.

It is worth noting that the method described above does not rely on the availability of each of the three control methods discussed in the context of FIGS. 2A and 2B. Instead, the method is functional even if only one or a couple of these controls are available on a given camera 104. This enables the approach to support the widest range of systems expected to be available in the market. The above approach can also be used with other camera controls to extract face images from poorly lit images.

In addition, it is not necessary for the processor performing image compensation to also perform the authentication. In some embodiments, a processor in camera 104 performs the image compensation while a processor in the computing device performs the authentication based on the image corrected images. In other embodiments, image compensation is performed on the computing device and authentication based on the image corrected images is performed on a server, or in the cloud. In yet other embodiments, image compensation is performed on the camera and authentication based on the corrected images is performed on a server, or in the cloud.

The same can also be true for the invention itself, for best real-time performance we run it on the same processor connected to the camera, but it can potentially be run in the cloud as well, the real time performance will suffer but it would still work. Should probably add this to the claims that the processor does not necessarily need to be connected to the camera.

Figure 6:
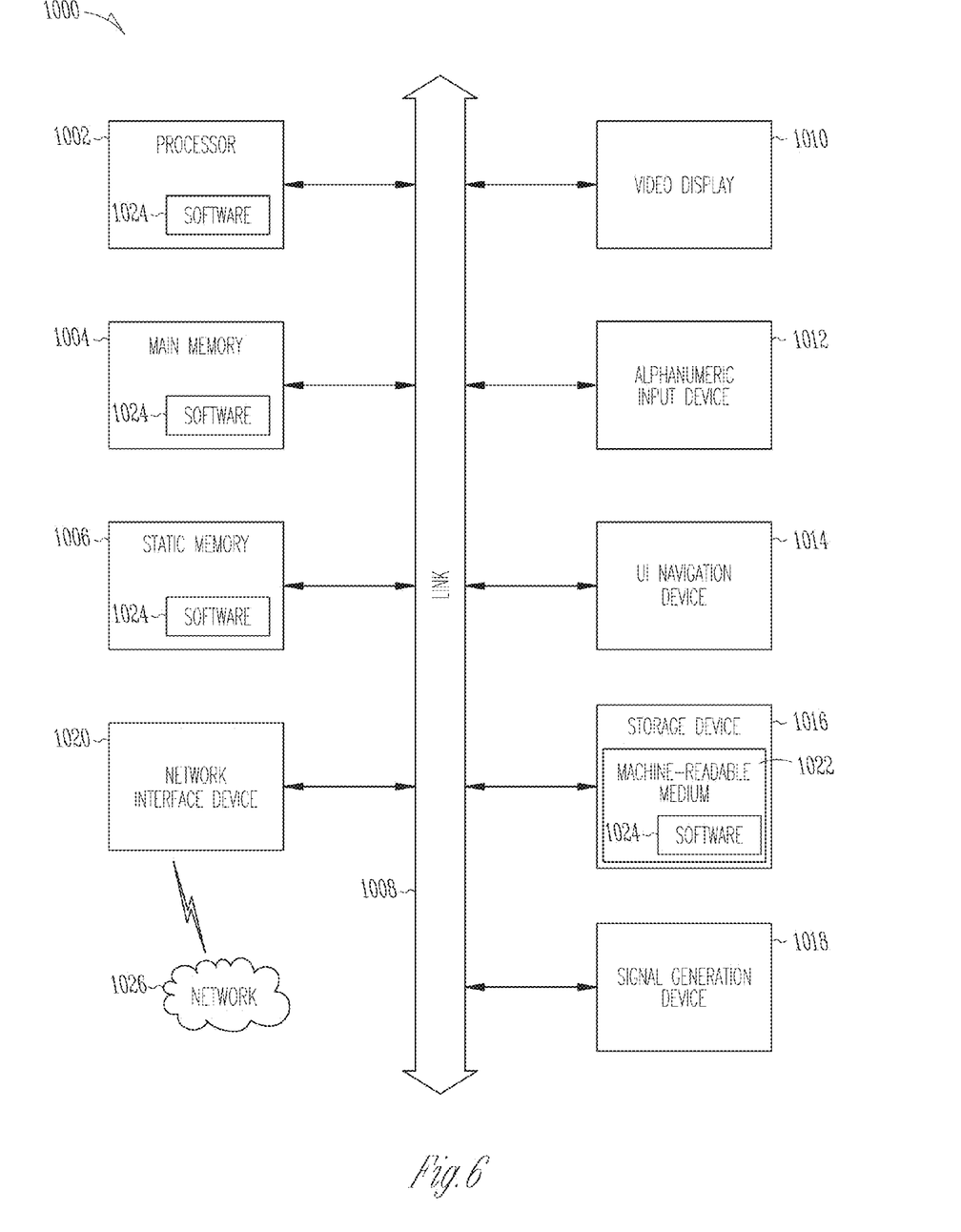
FIG. 6 is a block diagram illustrating an example machine upon which any one or more of the techniques (e.g., methodologies) discussed herein may perform, according to an example embodiment.

FIG. 6 is a block diagram illustrating a machine in the example form of a computer system 102, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 102 includes at least one processor 1002 (e.g., a central processing unit (CPU), a graphics processing unit (GPU) or both, processor cores, compute nodes, etc.), a main memory 1004 and a static memory 1006, which communicate with each other via a link 1008 (e.g., bus). The computer system 102 may further include a video display unit 1010, an alphanumeric input device 1012 (e.g., a keyboard), and a user interface (UI) navigation device 1014 (e.g., a mouse). In one embodiment, the video display unit 1010, input device 1012 and UI navigation device 1014 are incorporated into a touch screen display. The computer system 102 may additionally include a storage device 1016 (e.g., a drive unit), a signal generation device 1018 (e.g., a speaker), a network interface device 1020, and one or more sensors (not shown), such as a global positioning system (GPS) sensor, compass, accelerometer, or other sensor.

The storage device 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004, static memory 1006, and/or within the processor 1002 during execution thereof by the computer system 102, with the main memory 1004, static memory 1006, and the processor 1002 also constituting machine-readable media.

While the machine-readable medium 1022 is illustrated in an example embodiment to be a single medium, the term "machine-readable medium" may include a single medium or multiple media (e.g., a centralized or distributed database, and/or associated caches and servers) that store the one or more instructions 1024. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples:

Example 1 includes subject matter for a user authentication system (such as a device, apparatus, or machine) comprising: a camera; and a processor, connected to the camera, wherein the processor receives images from the camera, searches for a user feature in the images, determines if the images require correction, adjusts camera controls in a pre-defined order to provide desired corrections, applies the desired corrections to subsequent images and authenticates the user based on the user feature in the corrected images.

In Example 2, the subject matter of Example 1 may include, wherein the images are video frames.

In Example 3, the subject matter of any one of Examples 1 to 2 may include, wherein the processor adjusts camera controls for exposure.

In Example 4, the subject matter of any one of Examples 1 to 3 may include, wherein the processor adjusts camera controls for gain.

In Example 5, the subject matter of any one of Examples 1 to 4 may include, wherein the processor adjusts camera controls for gamma.

In Example 6, the subject matter of any one of Examples 1 to 5 may include, wherein the processor adjusts camera controls selected from the group of camera controls consisting of camera controls for exposure, for gamma and for gain.

In Example 7, the subject matter of any one of Examples 1 to 6 may include, wherein the user feature is a face.

In Example 8, the subject matter of any one of Examples 1 to 7 may include, wherein the processor determines when subsequent images no longer need correction and sets the camera controls to a different configuration.

In Example 9, the subject matter of any one of Examples 1 to 8 may include, wherein the processor determines when subsequent images no longer need correction and sets the camera controls to an initial state.

In Example 10, the subject matter of any one of Examples 1 to 9 may include, wherein the processor sets the camera controls back to an initial state over a plurality of frames when subsequent images no longer need correction.

In Example 11, the subject matter of any one of Examples 1 to 10 may include, wherein the camera is separate from the processor.

In Example 12, the subject matter of any one of Examples 1 to 11 may include, wherein the processor is in a computing device and wherein the camera is incorporated into the computing device.

In Example 13, the subject matter of any one of Examples 1 to 12 may include, wherein the processor determines if the image requires correction by checking image quality.

In Example 14, the subject matter of any one of Examples 1 to 13 may include, wherein the processor determines if the image requires correction by analyzing facial landmarks in the image.

In Example 15, the subject matter of any one of Examples 1 to 14 may include, wherein the camera includes one or more of a visual light sensor and an infrared sensor.

Example 16 includes subject matter (such as a method, means for performing acts, machine readable medium including instructions that when performed by a machine cause the machine to performs acts, or an apparatus to perform) comprising: capturing images of a user, wherein each image includes a user feature; searching for the user feature in the captured image; determining if the image requires correction; if the image requires correction, adjusting camera controls in a pre-defined order to provide desired corrections; and applying the corrections to subsequent images.

In Example 17, the subject matter of Example 16 may include, wherein capturing images includes extracting the images from video.

In Example 18, the subject matter of any one of Examples 16 to 17 may include, wherein adjusting camera controls includes adjusting camera controls for exposure.

In Example 19, the subject matter of any one of Examples 16 to 18 may include, wherein adjusting camera controls includes adjusting camera controls for gain.

In Example 20, the subject matter of any one of Examples 16 to 19 may include, wherein adjusting camera controls includes adjusting camera controls for gamma.

In Example 21, the subject matter of any one of Examples 16 to 20 may include, wherein adjusting camera controls includes selecting a camera control from the group of camera controls consisting of camera controls for exposure, camera controls for gamma and camera controls for gain.

In Example 22, the subject matter of any one of Examples 16 to 21 may include, wherein adjusting camera controls includes: a) adjusting camera controls for exposure; b) checking image quality of one or more subsequent images; c) if further correction is needed, adjusting camera controls for gamma; d) checking image quality of one or more subsequent images; and e) if further correction is needed, adjusting camera controls for gain.

In Example 23, the subject matter of any one of Examples 16 to 22 may include, wherein searching for the user feature in the captured image includes detecting a face.

In Example 24, the subject matter of any one of Examples 16 to 23 may include, wherein the method further comprises authenticating the user based on the user feature in the corrected images.

In Example 25, the subject matter of any one of Examples 16 to 24 may include, wherein authenticating includes executing a cloud-based authentication routine.

In Example 26, the subject matter of any one of Examples 16 to 25 may include, wherein the method further comprises: determining when subsequent images no longer need correction; and resetting the camera controls to an initial state when subsequent images no longer need correction.

In Example 27, the subject matter of any one of Examples 16 to 26 may include, wherein the correction includes bright image correction.

In Example 28, the subject matter of any one of Examples 16 to 27 may include, wherein the correction includes dark image correction.

In Example 29, the subject matter of any one of Examples 16 to 28 may include, wherein determining if the image requires correction includes executing program code in a processor to check image quality.

In Example 30, the subject matter of any one of Examples 16 to 29 may include, wherein determining if the image requires correction includes checking image quality.

In Example 31, the subject matter of any one of Examples 16 to 30 may include, wherein checking image quality includes generating a grayscale histogram of the image.

In Example 32, the subject matter of any one of Examples 16 to 31 may include, wherein determining if the image requires correction includes analyzing facial landmarks in the image.

In Example 33, the subject matter of any one of Examples 16 to 32 may include, wherein determining if the image requires correction includes detecting a face, measuring image quality of the face detected and correcting the image as a function of the measured image quality.

Example 34 includes at least one machine-readable medium including instructions, which when executed by a machine, cause the machine to perform operations of any of the Examples 16-33.

Example 35 includes an apparatus comprising means for performing any of the Examples 16-33.

Example 36 includes subject matter (such as a device, apparatus, or machine) comprising: a camera; and a processor, connected to the camera, wherein the processor includes: means for searching for a user feature in an image received from the camera; means for determining if the image requires correction; and means for adjusting camera controls in a pre-defined order to provide desired corrections.

In Example 37, the subject matter of Example 36 may include, wherein the means for searching for a user feature includes means for extracting the image from a video frame.

In Example 38, the subject matter of any one of Examples 36 to 37 may include, wherein the means for adjusting camera controls includes means for adjusting camera controls for exposure.

In Example 39, the subject matter of any one of Examples 36 to 38 may include, wherein the means for adjusting camera controls includes means for adjusting camera controls for gain.

In Example 40, the subject matter of any one of Examples 36 to 39 may include, wherein the means for adjusting camera controls includes means for adjusting camera controls for gamma.

In Example 41, the subject matter of any one of Examples 36 to 40 may include, wherein the means for adjusting camera controls includes means for adjusting exposure, gamma and gain.

In Example 42, the subject matter of any one of Examples 36 to 41 may include, wherein the means for searching for the user feature in the image includes means for detecting a face.

In Example 43, the subject matter of any one of Examples 36 to 42 may include, wherein the apparatus further includes means for authenticating a user as a function of the user feature.

In Example 44, the subject matter of any one of Examples 36 to 43 may include, wherein the processor further includes: means for determining when subsequent images no longer need correction; and means for resetting the camera controls to an initial state when subsequent images no longer need correction.

In Example 45, the subject matter of any one of Examples 36 to 44 may include, wherein the correction includes bright image correction.

In Example 46, the subject matter of any one of Examples 36 to 45 may include, wherein the correction includes dark image correction.

In Example 47, the subject matter of any one of Examples 36 to 46 may include, wherein the means for determining if the image requires correction includes means for executing program code in a processor to check image quality.

In Example 48, the subject matter of any one of Examples 36 to 47 may include, wherein the means for determining if the image requires correction includes means for checking image quality.

In Example 49, the subject matter of any one of Examples 36 to 48 may include, wherein the means for checking image quality includes means for generating a grayscale histogram of the image.

In Example 50, the subject matter of any one of Examples 36 to 49 may include, wherein the means for determining if the image requires correction includes means for analyzing facial landmarks in the image.

In Example 51, the subject matter of any one of Examples 36 to 50 may include, wherein the means for determining if the image requires correction includes means for detecting a face, means for measuring image quality of the detected face and means for determining, as a function of the measured image quality of the detected face, camera controls to adjust.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A user authentication system, comprising:
   a camera; and
   a processor, connected to the camera, wherein the processor receives images from the camera, searches for a user feature in the images, determines if the images require correction, adjusts camera controls in a pre-defined order to provide desired corrections, applies the desired corrections to subsequent images and authenticates the user based on the user feature in the corrected images,
   wherein to adjust camera controls, the processor:
   a) adjusts camera controls for exposure;
   b) checks image quality of one or more subsequent images;
   c) if further correction is needed, adjusts camera controls for gamma;
   d) checks image quality of one or more subsequent images; and
   e) if further correction is needed, adjusts camera controls for gain.

2. The system of claim 1, wherein the processor adjusts camera controls selected from the group of camera controls consisting of camera controls for exposure, for gamma and for gain.

3. The system of claim 1, wherein the processor determines when subsequent images no longer need correction and sets the camera controls to a different configuration.

4. The system of claim 1, wherein the processor determines when subsequent images no longer need correction and sets the camera controls to an initial state.

5. The system claim 1, wherein the camera includes one or more of a visual light sensor and an infrared sensor.

6. A method, comprising:
   capturing images of a user, wherein each image includes a user feature;
   searching for the user feature in the captured image;
   determining if the image requires correction;
   if the image requires correction, adjusting camera controls in a pre-defined order to provide desired corrections; and
   applying the corrections to subsequent images,
   wherein adjusting camera controls includes:
   a) adjusting camera controls for exposure;
   b) checking image quality of one or more subsequent images;
   c) if further correction is needed, adjusting camera controls for gamma;
   d) checking image quality of one or more subsequent images; and
   e) if further correction is needed, adjusting camera controls for gain.

7. The method of claim 6, wherein adjusting camera controls includes adjusting camera controls for exposure.

8. The method of claim 6, wherein adjusting camera controls includes adjusting camera controls for gain.

9. The method of claim 6, wherein adjusting camera controls includes adjusting camera controls for gamma.

10. The method of claim 6, wherein adjusting camera controls includes selecting a camera control from the group of camera controls consisting of camera controls for exposure, camera controls for gamma and camera controls for gain.

11. The method of claim 6, wherein searching for the user feature in the captured image includes detecting a face.

12. The method of claim 6, wherein the method further comprises authenticating the user based on the user feature in the corrected images.

13. The method of claim 6, wherein the method further comprises:
   determining when subsequent images no longer need correction; and
   resetting the camera controls to an initial state when subsequent images no longer need correction.

14. The method of claim 6, wherein the correction includes dark image correction.

15. The method of claim 6, wherein determining if the image requires correction includes checking image quality.

16. The method of claim 15, wherein checking image quality includes generating a grayscale histogram of the image.

17. The method of claim 6, wherein determining if the image requires correction includes analyzing facial landmarks in the image.

18. At least one non-transitory machine-readable medium including instructions, which when executed by a machine, cause the machine to:
   capture images of a user, wherein each image includes a user feature;
   search for the user feature in the captured image;
   determine if the image requires correction;
   if the image requires correction, adjust camera controls in a pre-defined order to provide desired corrections; and
   apply the corrections to subsequent images,
   wherein the instructions to adjust camera controls include instructions to:
   a) adjust camera controls for exposure;
   b) check image quality of one or more subsequent images;
   c) if further correction is needed, adjust camera controls for gamma;
   d) check image quality of one or more subsequent images; and
   e) if further correction is needed, adjust camera controls for gain.

19. The at least one non-transitory machine-readable medium of claim 18, wherein the instructions to adjust camera controls include instructions to adjust camera controls for exposure.

20. The at least one non-transitory machine-readable medium of claim 18, wherein instructions to search for the user feature in the captured image include instructions to detect a face.

21. The at least one non-transitory machine-readable medium of claim 18, comprising instructions to:
   determine when subsequent images no longer need correction; and
   reset the camera controls to an initial state when subsequent images no longer need correction.

22. The at least one non-transitory machine-readable medium of claim 18, wherein the instructions to determine if the image requires correction include instructions to checking image quality.

23. The at least one non-transitory machine-readable medium of claim 22, wherein the instructions to check image quality include instructions to generate a grayscale histogram of the image.

24. The at least one non-transitory machine-readable medium of claim 18, wherein the instructions to determine if the image requires correction include instructions to analyze facial landmarks in the image.

* * * * *

UNITED STATES PATENT AND TRADEMARK OFFICE
CERTIFICATE OF CORRECTION

PATENT NO.       : 9,712,744 B2
APPLICATION NO.  : 14/779879
DATED            : July 18, 2017
INVENTOR(S)      : Ghosh et al.

It is certified that error appears in the above-identified patent and that said Letters Patent is hereby corrected as shown below:

In Column 12, Line 36, in Claim 5, after "system", insert --of--

Signed and Sealed this
Tenth Day of April, 2018

Andrei Iancu
*Director of the United States Patent and Trademark Office*